(12) United States Patent
Spaulding et al.

(10) Patent No.: US 7,583,406 B2
(45) Date of Patent: Sep. 1, 2009

(54) COLOR TRANSFORMS FOR CONCAVE DEVICE GAMUTS

(75) Inventors: Kevin E. Spaulding, Spencerport, NY (US); Gustav J. Braun, Fairport, NY (US)

(73) Assignee: Eastman Kodak Company, Rochester, NY (US)

(*) Notice: Subject to any disclaimer, the term of this patent is extended or adjusted under 35 U.S.C. 154(b) by 683 days.

(21) Appl. No.: 11/210,168

(22) Filed: Aug. 23, 2005

(65) Prior Publication Data

US 2007/0052986 A1  Mar. 8, 2007

(51) Int. Cl.
*H04N 1/60* (2006.01)

(52) U.S. Cl. .......................... 358/1.9; 358/518; 358/523

(58) Field of Classification Search .................. 358/1.9, 358/2.1, 500, 501, 504, 518, 520, 523; 382/162, 382/167
See application file for complete search history.

(56) References Cited

U.S. PATENT DOCUMENTS

| | | | |
|---|---|---|---|
| 4,941,038 A | 7/1990 | Walowit | |
| 4,992,861 A | 2/1991 | D'Errico | |
| 5,299,291 A * | 3/1994 | Ruetz | 358/1.9 |
| 5,510,910 A | 4/1996 | Bockman et al. | |
| 5,539,540 A | 7/1996 | Spaulding et al. | |
| 5,574,666 A | 11/1996 | Ruetz et al. | |
| 5,583,666 A | 12/1996 | Ellson et al. | |
| 5,696,839 A | 12/1997 | Siegeritz | |
| 5,704,026 A | 12/1997 | Wan | |
| 5,721,572 A | 2/1998 | Wan et al. | |
| 5,731,818 A | 3/1998 | Wan et al. | |
| 5,857,063 A | 1/1999 | Poe et al. | |
| 5,883,632 A | 3/1999 | Dillinger | |

FOREIGN PATENT DOCUMENTS

| | | |
|---|---|---|
| EP | 0592141 | 9/1993 |
| EP | 0973328 | 7/1999 |
| WO | 03/079669 | 9/2003 |

OTHER PUBLICATIONS

Maarten van Gestel and Henk Draaisma; Color Gamut Mapping Along Eelectrostatic Field Lines; NIP17: International Conference On Digital Printing Technologies; pp. 801-803.
Peter Zolliker et al.; On the Continuity of Gamut Mapping Algorithms; SPIE-IS&T/vol. 5667, pp. 220-233.
Optimization of the Spectral Neugabauer Model for Printer Characterization Published in Journal of Electronic Imaging, vol. 8, pp. 156-166, Apr. 1999.
Computation Geometry-An Introduction by Preparata and Shamos, published by Springer-/Verlag in 1990.

* cited by examiner

*Primary Examiner*—Thomas D Lee
(74) *Attorney, Agent, or Firm*—Raymond L. Owens

(57) ABSTRACT

Method for building color transforms for color imaging devices having concave color gamut regions, including forming a device model that relates device control signals for a color imaging device to corresponding device-independent color values in a device-independent color space; forming a device color gamut representing the set of colors in the device-independent color space that are producible by the color imaging device; and forming a convex color gamut by fitting a convex hull to the device color gamut. The method further includes forming an expanded device model that relates device control signals for the color imaging device to expanded device-independent color values in the device-independent color space, such that the expanded device-independent color values fill the convex color gamut; and building a color transform that relates input device-independent color values to corresponding device control signals for the color imaging device using the expanded device model.

20 Claims, 8 Drawing Sheets

COLOR TRANSFORMS FOR CONCAVE DEVICE GAMUTS

FIELD OF THE INVENTION

The field of the present invention pertains to the color management of digital color imaging devices, and more particularly to a gamut-mapping method for color imaging devices having color gamuts with one or more concave surface regions.

BACKGROUND OF THE INVENTION

Different color imaging devices will generally have a different relationship between the device control values for the color imaging device (e.g. RGB or CMY(K)) and the resulting device-independent color that is produced by the color imaging device. As a result, the field of color management has been developed in order to be able to determine the device control signals for a second color imaging device that would produce the same color appearance as a set of device control values for a first color imaging device. This is generally done by developing device models for the first and second color imaging devices that relate the device control signals to corresponding color values in a device-independent color space. Common device-independent color spaces that can be used for this purpose include the well-known CIE XYZ, CIELAB, and CIELUV color spaces. Color appearance spaces such as CIECAM02 can also be used.

A generic color management process is illustrated in FIG. 1. The input to the process is a set of first device control values 10, that produce a desired color on a first color imaging device. For example, they could be RGB code values for a soft-copy video display. A first device color model 11 is used to determine corresponding device-independent color values 12. Commonly the device-independent color values 12 will be in the CIELAB color space, or some other approximately visually uniform color space. Next a second device color model 13 is used to determine a set of corresponding second device color values 14 appropriate for producing the desired color on a second color imaging device. For example, if the second color imaging device is a color inkjet printer, the second device color values 14 would commonly be CMYK code values. In many color management implementations, the first device color model 11 and the second device color model 13 are combined to form a composite color transform 15 that can be used to transform the first device color values 10 directly to the second device color values 14.

One factor that complicates this color transformation process is that color imaging devices will generally have different color gamuts. (The term color gamut refers to the range of colors which can be represented or displayed at some particular stage in an imaging system.) For example, the color gamut of a video display device may be quite different from the color gamut of a particular color printing device. As a result, some of the colors that can be produced by a first color imaging device may be outside of the gamut of the second color imaging device. The question then becomes what should be done with the out-of-gamut colors. Several different methods to handle this problem have been suggested in the past. One approach is to simply maintain the hue angle and lightness for the out-of-gamut colors and clip the chroma to the gamut boundary. Depending on the relative shapes of the color gamuts of the input and output devices, this can sometimes produce unsatisfactory results when the gamut-mapped color is significantly lower in chroma than the input color.

Many variations of gamut-mapping algorithms that maintain the hue and clip out-of-gamut colors to the color gamut surface have been developed. Many of these techniques work by projecting out-of-gamut color toward a point on the neutral axis that is a function of the input color and the shape of the device color gamut.

In U.S. Pat. No. 5,299,291, Ruetz discloses a gamut-mapping method that preserves hue and clips out-of-gamut colors to the surface of the gamut by projecting at a constant angle so as to preserve smooth color transitions. Since the method relies on finding a gamut radius for a certain hue and lightness, problems can results when the gamut contains radial concavities. Therefore, it is necessary to modify the color gamut boundary to eliminate any such radial concavities if they exist. In U.S. Pat. No. 5,574,666, Ruetz et al disclose a variation of this basic method where the gamut projections are applied in a Munsell color space.

In U.S. Pat. No. 5,510,910, Bockman et al. teach determining the relative position of an input color in an input color gamut and transforming it to a color with the same relative position in an output color gamut. This process is accomplished by normalizing the shape of the two color gamuts in a perceptual color space. Although this has the advantage that it more fully utilizes the color gamut of the output device, it has the disadvantage that in-gamut colors can be distorted significantly.

In U.S. Pat. No. 5,883,632, Dillinger teaches a similar gamut method that preserves the relative position of colors within the hue leaves when transforming from an input color gamut to an output color gamut. This technique is still susceptible to significant color distortions for in-gamut colors.

In U.S. Pat. No. 5,696,839, Siegeritz teaches transforming the input color gamut to a standardized intermediate cylindrical color gamut, which is distorted and then transformed to the output color gamut.

In U.S. Pat. No. 5,539,540, Spaulding et al. disclose a gamut-mapping method where an input gamut is warped in such a way that high chroma colors in an input gamut are mapped to user-defined preferred high chroma colors in an output gamut. In U.S. Pat. No. 5,583,666, Ellson et al teach a variation of this method wherein the accuracy of colors in the core of the color gamut can be accurately maintained. The color transforms created using these methods are not guaranteed to map all of the input colors to colors inside the output color gamut. As a result, it may be necessary to apply a "clean-up" gamut-mapping step to deal with any colors that remain outside the output color gamut.

Another gamut-mapping method has been described by Walowit in U.S. Pat. No. 4,941,038, where an in-gamut color is selected having the shortest vector difference from an aim color in a uniform color space. If the uniform color space is CIELAB, this approach is equivalent to determining the device color having the minimum $\Delta E^*$ color difference to the input color. Variations of this approach involve weighting the hue, lightness and chroma components of the color difference in order to be able to trade off the relative importance of these color attributes. In U.S. Pat. No. 5,731,818, Wan et al. have disclosed another variation of this method where the minimum color difference point is determined subject to user defined tolerances for lightness change and hue shift.

The family of techniques based on determining the minimum color difference have an advantage over techniques that are strictly hue preserving because it is often possible to make a much better color match if the hue is allowed to vary slightly during the gamut-mapping process. However, these techniques can be susceptible to producing artifacts when they are used for color imaging devices having a concave gamut surface. One common problem that is encountered is illustrated in FIG. 2, which shows a cross-section through a concave color gamut 20. The cross-section is taken in the CIELAB color space so that the vertical axis corresponds to the L* value and the horizontal axis corresponds to the a* value. It can be seen that the lower right surface of the concave color gamut 20 (corresponding to colors with positive a* values and dark L* values) is concave. Consider a pair of out-of-gamut colors 22. If a minimum color difference gamut-mapping method is used to map these colors onto the concave color gamut 20, they will be mapped to gamut-mapped colors 24. It can be seen that the gamut-mapped colors 24 are much farther apart than the out-of-gamut colors 22. Consequently, a small color difference in an input image will get mapped to a large color difference in an output image. As a result, this will generally cause a contour artifact in the output image.

SUMMARY OF THE INVENTION

It is an object of the present invention to provide a method for robustly determining color transforms for color imaging devices having color gamuts with one or more having color gamuts with one or more concave surface regions These objects are achieved by a method for building color transforms for color imaging devices having color gamuts with one or more concave surface regions, comprising:

a) forming a device model that relates device control signals for a color imaging device to corresponding device-independent color values in a device-independent color space;

b) forming a device color gamut that represents the set of colors in the device-independent color space that are producible by the color imaging device, wherein the device color gamut has one or more concave surface regions;

c) forming a convex color gamut by fitting a convex hull to the device color gamut;

d) forming an expanded device model that relates device control signals for the color imaging device to expanded device-independent color values in the device-independent color space, such that the expanded device-independent color values fill the convex color gamut; and e) building a color transform that relates input device-independent color values to corresponding device control signals for the color imaging device using the expanded device model.

ADVANTAGES

The present invention has the advantage that color transforms can be produced for color imaging devices having color gamuts with one or more concave surface regions that are less susceptible to image degradations such as contouring artifacts. This advantage is particularly significant when minimum color difference gamut mapping methods are used to map device-independent color values that are outside the device color gamut.

DETAILED DESCRIPTION OF THE INVENTION

Figure 3:
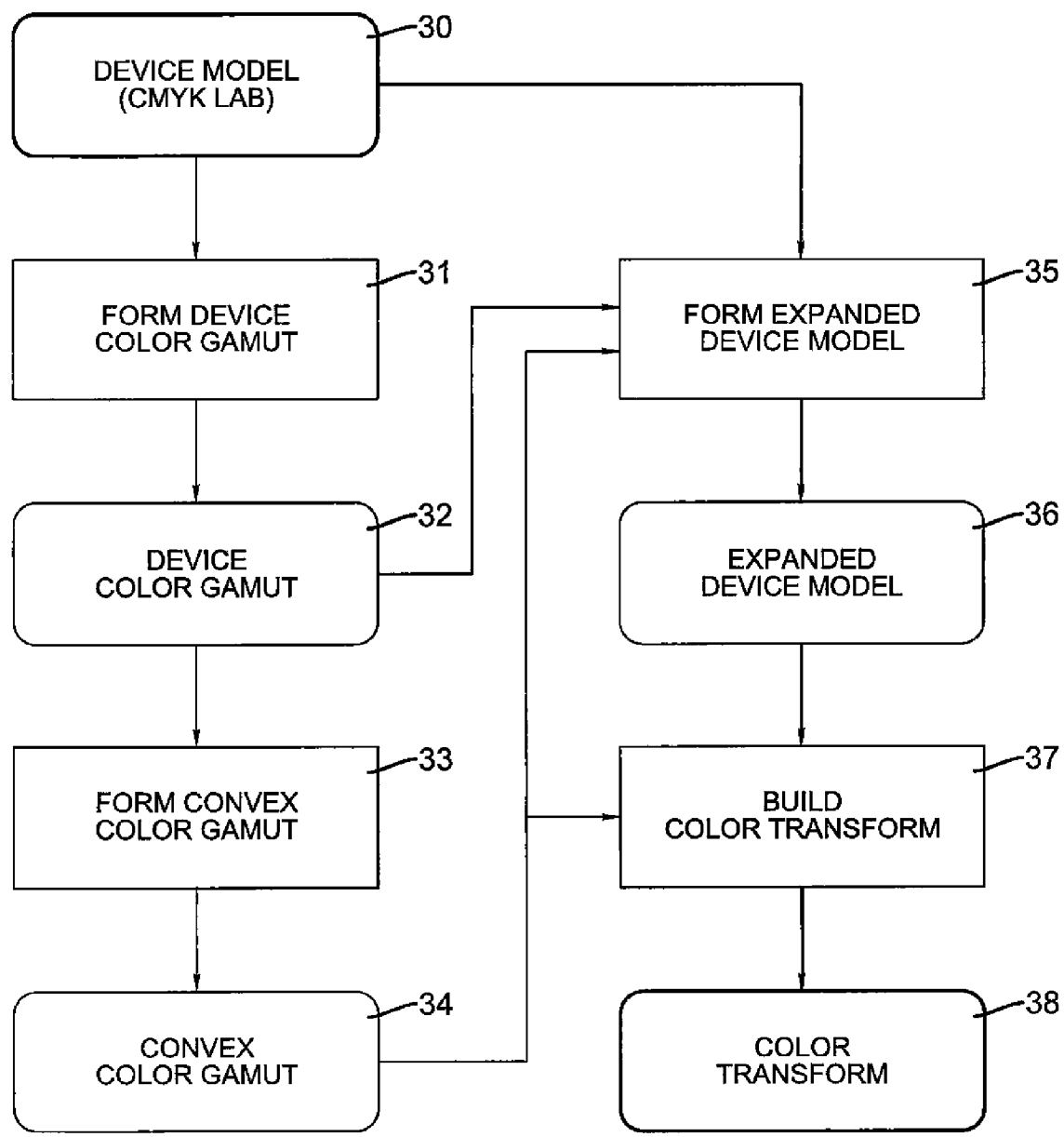
FIG. 3 is a flowchart illustrating the method of the present invention.

Turning now to FIG. 3, there is shown a flowchart illustrating the method of the present invention, which is a method for building color transforms for a color imaging device having color gamuts with one or more concave surface regions. First, a device model 30 for the color imaging device is formed, relating device control signals for the color image device to corresponding device-independent color values in a device-independent color space. Next, a form device color gamut step 31 is used to form a device color gamut 32 representing the set of colors in the device-independent color space that can be produced by the color imaging device. The device color gamut 32 can be viewed as a three-dimensional volume in the device-independent color space. The present invention is applicable to the case where the device color gamut 32 has one or more concave surface regions. A form convex color gamut step 33 is then used to form a convex color gamut 34 by fitting a convex hull to the device color gamut 32.

Next, a form expanded device model step 35 is used to form an expanded device model 36. The expanded device model 36 relates device control signals for the color imaging device to expanded device-independent color values in the device-independent color space, such that the expanded device-independent color values fill the convex color gamut 34. In a preferred embodiment of the present invention, the form expanded device model step 35 works by modifying the device-independent color values of the device model 30 by expanding them out towards the boundary of the convex color gamut 34 in color regions where the device color gamut 32 is concave.

Finally, a build color transform step 37 is used to build a color transform 38 relating input device-independent color values to corresponding device control signals using the expanded device model. In a preferred embodiment of the present invention, the build color transform step 37 includes the step of gamut mapping any input device-independent color values outside the convex color gamut 34 to modified device-independent color values within the convex color gamut 34. The device control signals corresponding to the modified device-independent color values are then determined by inverting the expanded device model 36.

The steps of the present invention that were outlined about will now be described in more detail. In a preferred embodiment of the present invention, the color imaging device is a digital printing device, such as an ink jet printer or a thermal dye transfer printer. However, the same method can also be applied to other types of color imaging devices. For example, it can be applied to softcopy display devices such as cathode ray tubes (CRTs), liquid crystal displays (LCDs) or organic light emitting diode displays (OLEDs). Some types of devices are more likely to have concave color gamut regions, and therefore are more likely to benefit from the present invention. For example, ink jet printers commonly have concave regions that can be quite pronounced, particularly when they are used with plain paper.

The device model 30 relating the device control signals for the color imaging device to corresponding device-independent color values can take on many different forms. In a preferred embodiment of the present invention, the device model 30 is a multi-dimensional look-up table where the nodes of the multi-dimensional look-up table store device-independent color values for a lattice of device control signals. The device-independent color values can be in any of a number of different device-independent color spaces, such as the well-known CIELAB, CIELUV, CIE XYZ or CIECAM02 color spaces. It will be obvious to one skilled in the art that many other device-independent color spaces could also be used in accordance with the present invention.

The device control signals will be a function of the type of the color imaging device. For many digital printing devices, the device control signals will be CMY or CMYK code values corresponding to the amount of cyan, magenta, yellow and black colorants. In some cases, digital printing devices can include additional colorants. For example, some digital printing devices include additional light colorants (such as light cyan and light magenta) in order to reduce the appearance of image noise. Other digital printing devices include colorants intended to provide a larger color gamut, such as red, blue, orange or green colorants. Softcopy display devices will typically have RGB device control signals, corresponding to red, green and blue primary colors. However, some displays also include additional primary colors to increase the color gamut or brightness of the display.

There are many ways that a multi-dimensional look-up table can be determined for use as the device model 30. For example, a set of test patches can be printed corresponding to a lattice of device control values, and the resulting device-independent color values can be measured directly using a device such as a spectrophotometer or a calorimeter. These measured values can then be stored directly in the multi-dimensional look-up table. Alternatively, the nodes of the multi-dimensional look-up table can be populated by fitting a model to measured patch data for a set of patches with known device control signals using a method such as the one described by D'Errico in U.S. Pat. No. 4,992,861. This has the advantage that it will smooth out much of the noise that can be introduced in the device model 30 by sources such as measurement error and printer variability.

Other types of device models can also be used in accordance with the present invention. For example, device models can be formed by modeling the physics of the color imaging device. This approach is common for modeling devices such as CRT displays where the device physics is fairly straightforward, but is more difficult for digital printing devices where there are often complex colorant/media interactions. In some cases, it is possible to determine the mathematical form of a device model based on the device physics, but then determine the values of a set of parameters that produce the best fit to a set of measured test patches. For example, Balasubramanian has described a method for optimizing a spectral Neugebauer model to measured printer characterization data (see the paper "Optimization of the spectral Neugabauer model for printer characterization" published in Journal of Electronic Imaging, Vol. 8, pp. 156-166, April 1999).

The form device color gamut step 31 can take on different forms depending on the form of the device model 30. In the preferred embodiment of the present invention where the device model 30 is a multi-dimensional look-up table, the facets of the multi-dimensional look-up table corresponding to the gamut surface can generally be identified by identifying those facets where one of the device control signals is at it's maximum or minimum values. The result of this method is to define the device color gamut 32 by a list of triangular facets representing the outer surface of the device-independent color values that can be produced with the device model 30. Alternatively, other techniques, such as those described by Wan in U.S. Pat. No. 5,704,026 and Wan et al. in U.S. Pat. No. 5,721,572, can used to determine the device color gamut 32 from the device model 30.

Figure 1:
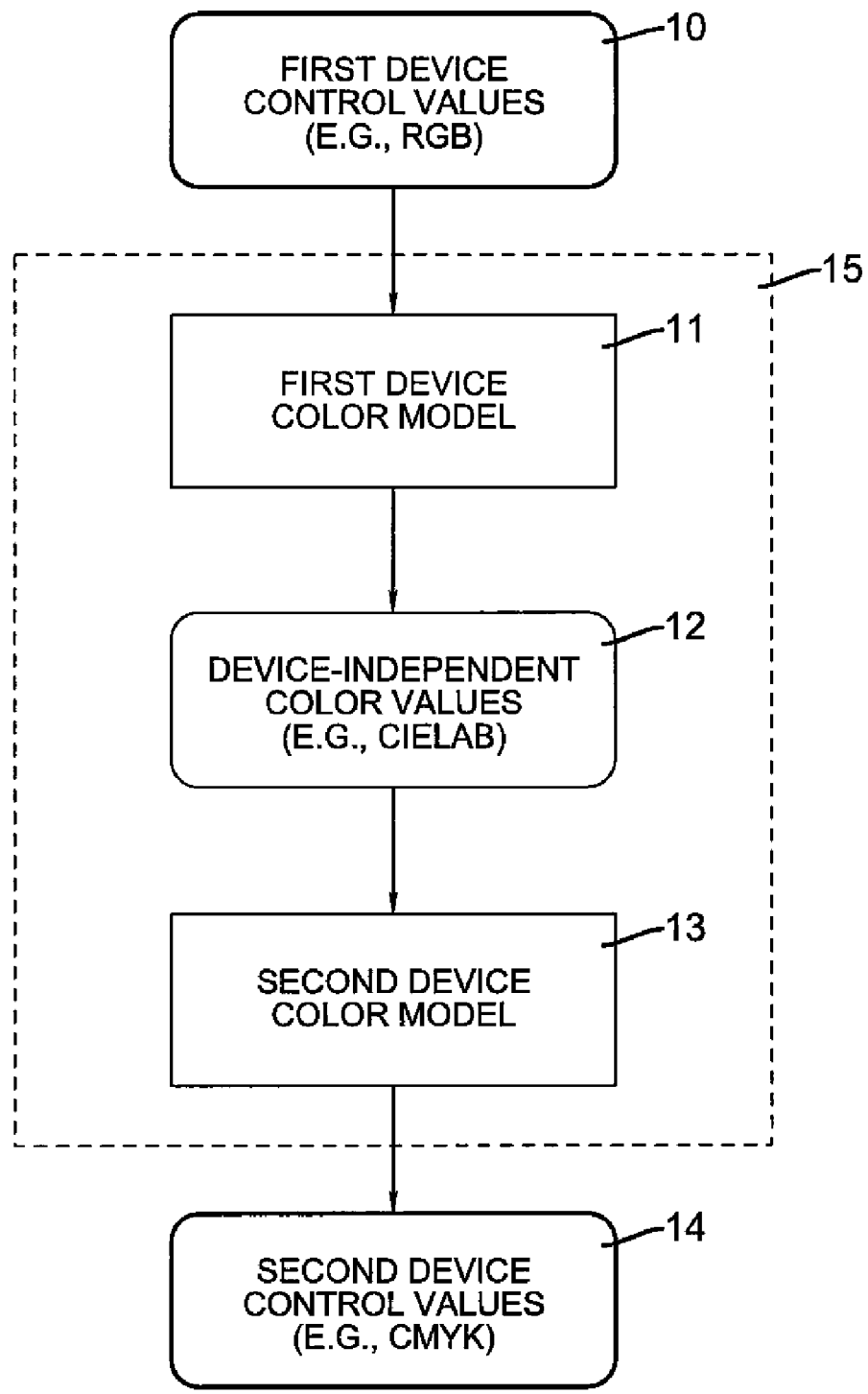
FIG. 1 is flowchart illustrating a generic color management process.
Figure 2:
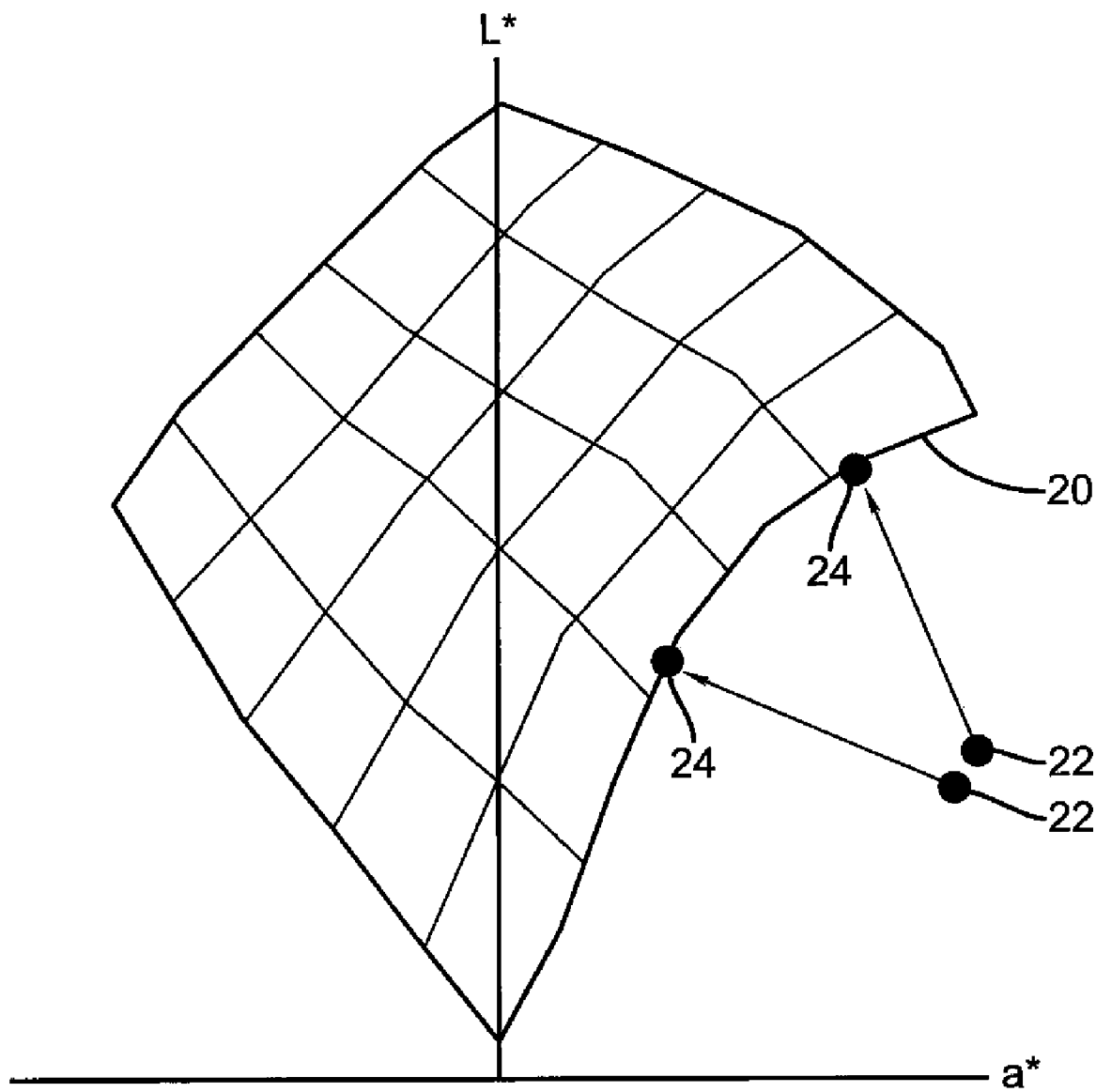
FIG. 2 is a diagram illustrating a common problem with using prior art minimum color difference gamut-mapping for a concave device gamut.
Figure 4:
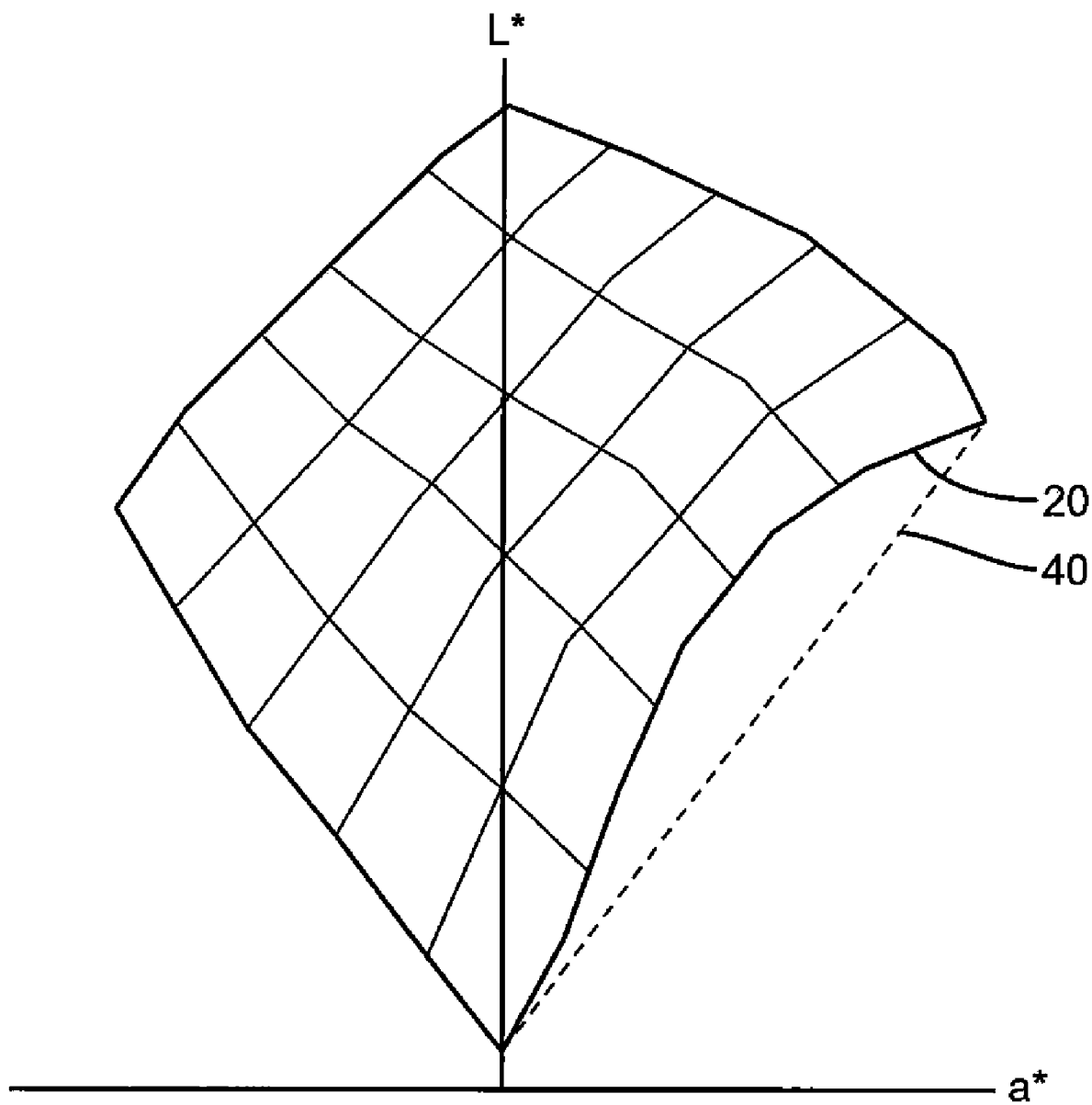
FIG. 4 is a diagram illustrating the results of applying a convex hull operation.

In a preferred embodiment of the present invention, the form convex color gamut step 33 is implemented by applying a convex hull algorithm to the device color gamut 33. Convex hull algorithms are well-known techniques used in computational geometry for determining the smallest convex surface enclosing a set of points. (See *Computation Geometry—An Introduction* by Preparata and Shamos, published by Springer-Verlag in 1990.) In this case, the set of points used to form the convex hull are those that define the triangular surface facets of the device color gamut 32. An illustration of the formation of a convex color gamut 32 is shown in FIG. 4. In this case, a cross-section of a concave color gamut 20 is shown as a solid boundary line. (This is the same concave color gamut 20 that shown in FIG. 2.) When the form convex color gamut step 33 is applied to this concave color gamut 20, the concave surface region is filled in forming a convex color gamut 40 shown as the dotted boundary line. (For the convex surfaces of the color gamut, the concave color gamut 20 and the convex color gamut 40 are identical.)

There are many ways that the form expanded device model step 35 can be implemented. As was discussed above, in a preferred embodiment of the present invention, the device model 30 is defined by a dimensional look-up table that stores device-independent color values for a lattice of device control signals. In this case, one method for implementing the expand device model step 35 is to proportionally expand the device-independent color values until the fill the convex color gamut 34.

Figure 5:
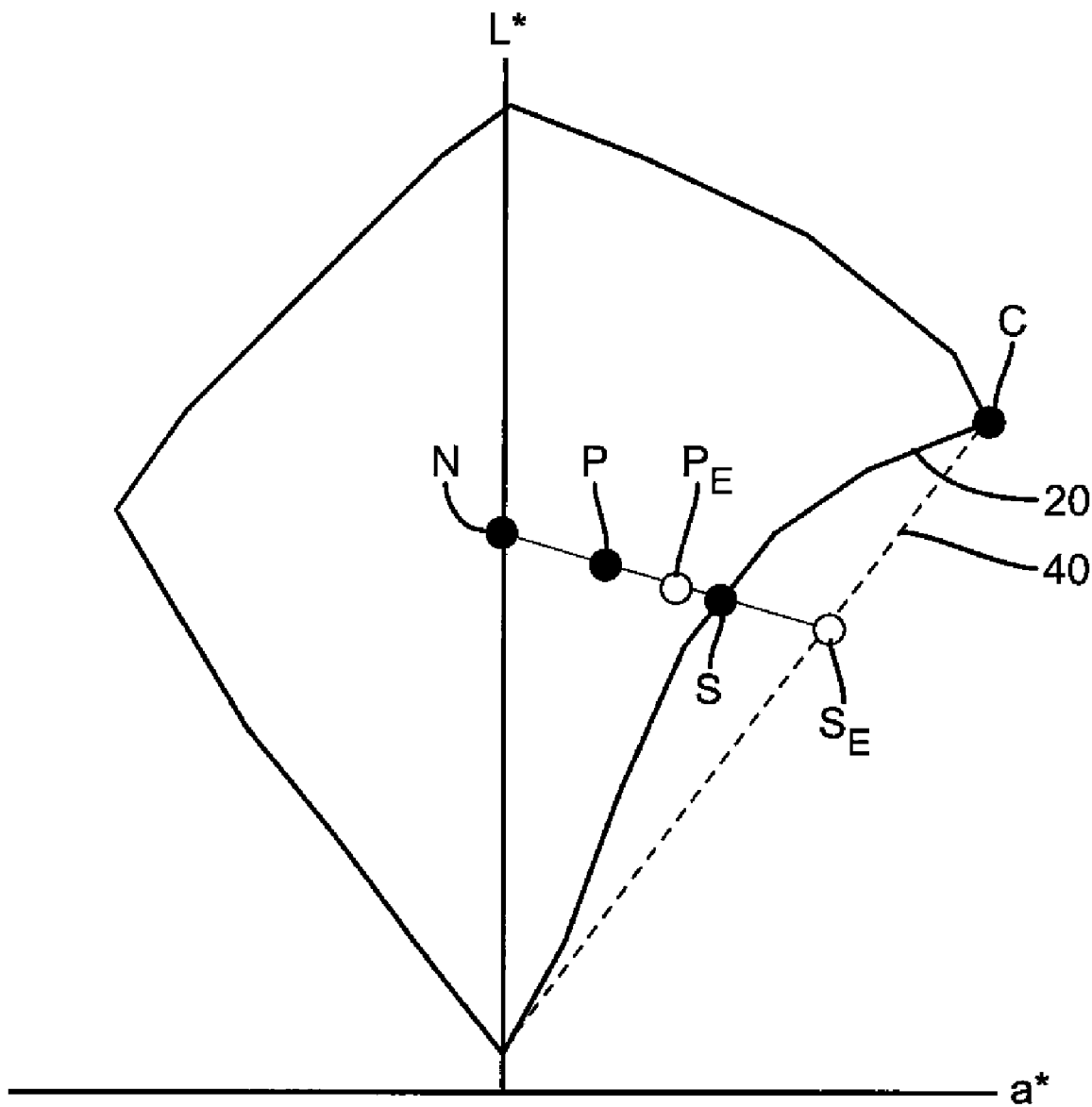
FIG. 5 is a diagram illustrating a gamut-expansion method usable with the present invention.

One way for doing this is illustrated in FIG. 5 where the solid boundary line shows the concave color gamut 20, and the dotted boundary line shows the convex color gamut 40 as also shown in FIG. 4. Consider a surface point S on the surface of the concave color gamut 20. This point can be mapped to an expanded surface point SE on the surface of the convex color gamut 40 by projecting outward from a central color point. In a preferred embodiment of the present invention, the central point is a neutral color point N located on the neutral axis of the device-independent color space (CIELAB in this example). The neutral color point N can be a fixed point; for example at the point $L^*=50$, $a^*=0$, $b^*=0$. Alternatively, it can be desirable to have the lightness of the neutral color point N be a function of hue angle. For example, the lightness of the neutral color point N can be set equal to the lightness of the "cusp point" of the color gamut at the hue angle of the surface point S. (The cusp point of the color gamut refers to the point with the highest chroma at a given hue angle, and is shown as the point C on FIG. 5.)

An analogous procedure can be used for points within the concave color gamut 20. Consider the color point P, which is located in a region of the color gamut where the gamut surface is concave. To maintain smoothness and continuity for the device model, it will generally be desirable to expand this color as well. In a preferred embodiment of the present invention, this can be done by determining the relative position of the device-independent color value for the color point P within the device color gamut; and then determining an expanded device-independent color value within the convex color gamut responsive to this relative position.

One way for determining the relative position of the device-independent color value for the color point P is to compute the fractional position $F_P$ of the color point P between the neutral color point N and the surface color point S:

$$F_P = |\overrightarrow{NP}|/|\overrightarrow{NS}|$$

where $|\overrightarrow{NP}|$ is the length of the vector connecting the neutral color point N and the color point P, and $|\overrightarrow{NS}|$ is the length of the vector connecting the neutral color point N and the surface color point S. The expanded color point $P_E$ can then be determined by computing the device-independent color value having the same relative position in the convex color gamut between the neutral color point N and the expanded surface color point $S_E$. This can be done by equating the original fractional position $F_P$ to an expanded fractional position $F_E$:

$$F_P = F_E = |\overrightarrow{NP_C}|/|\overrightarrow{NS_C}|$$

where $|\overrightarrow{NP_E}|$ is the length of the vector connecting the neutral color point N and the expanded color point $P_E$, and $|\overrightarrow{NS_E}|$ is the length of the vector connecting the neutral color point N and the expanded surface color point $S_E$. The expanded color point $P_E$ can then be computed using the following equation:

$$P_E = N + F_E \overrightarrow{NS_C}$$

where $\overrightarrow{NS_C}$ is the vector connecting the neutral color point N and the expanded surface color point $S_E$.

Figure 7:
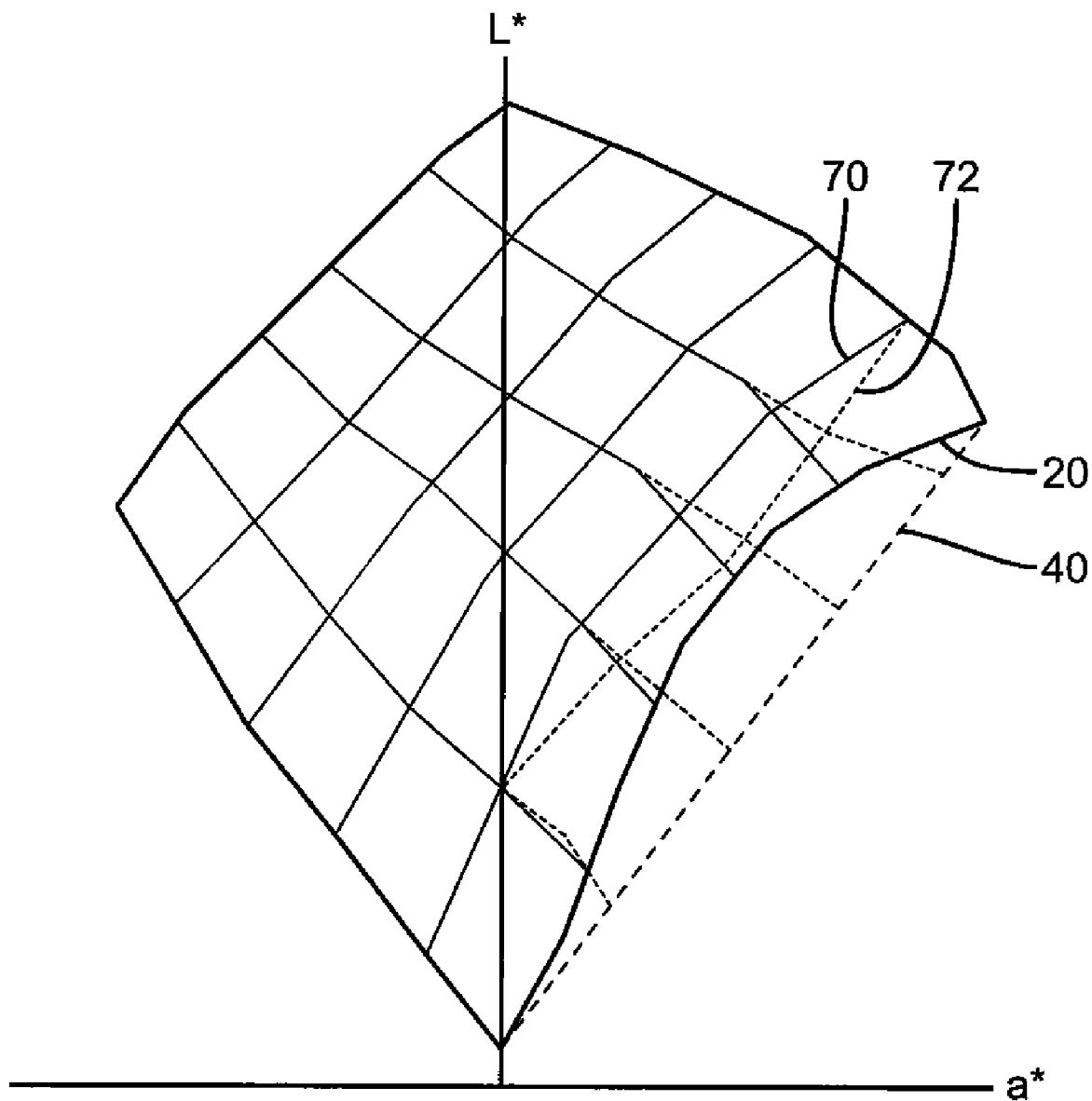
FIG. 7 is a diagram illustrating an expanded device model in accordance with the present invention.

FIG. 7 shows an illustration of a cross-section through an original device model and a corresponding expanded device model. An original device model lattice 70 is shown as the lattice of solid lines, bounded by the concave color gamut 20. The expanded device model lattice 72 is shown as the lattice of dotted lines, bounded by the convex color gamut 40. It can be seen that the nodes of the original device model lattice 70 have only been expanded in those regions of the color gamut where the original color gamut had a concave surface region.

Figure 6:
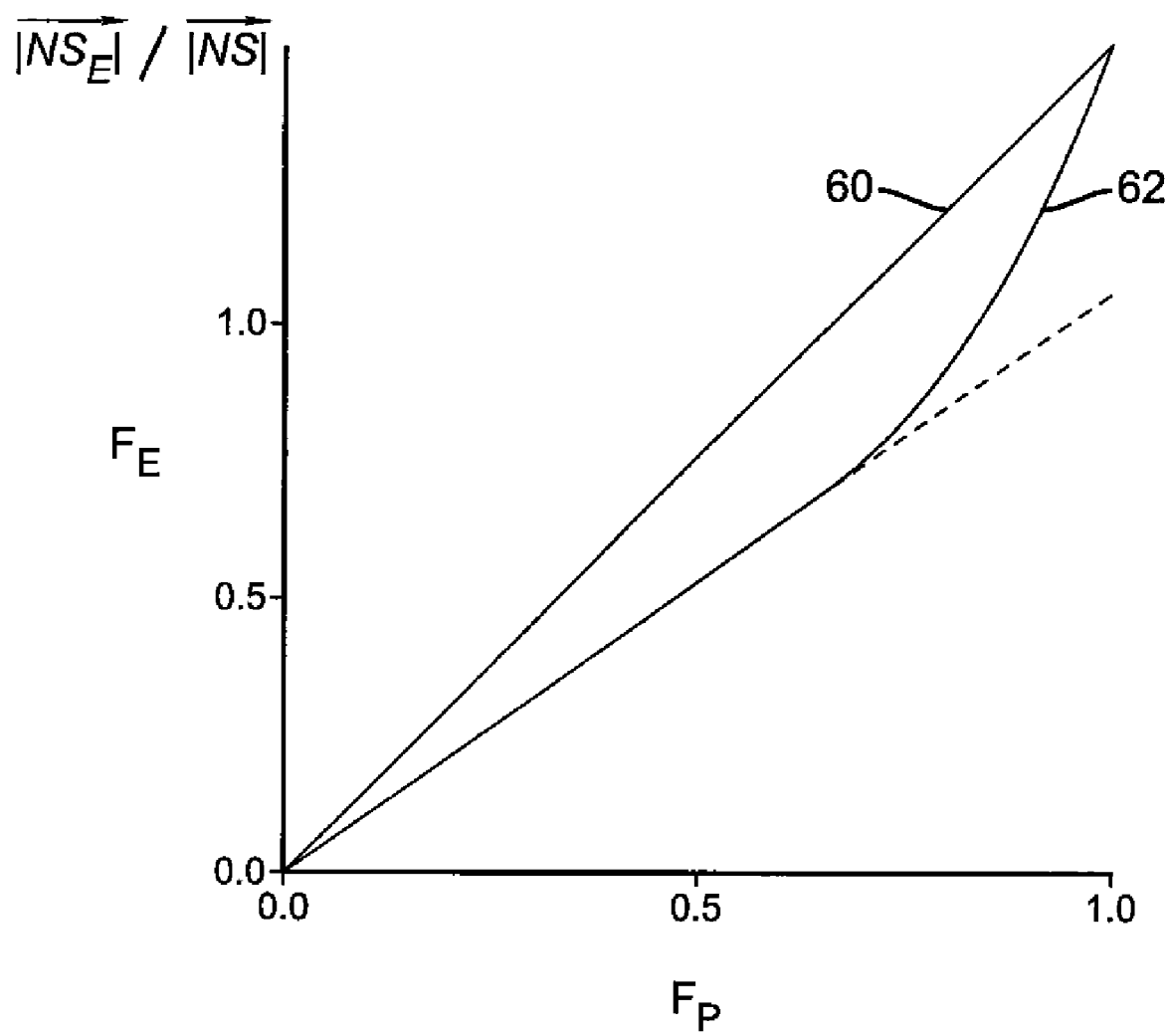
FIG. 6 is a graph showing example gamut expansion functions usable with the present invention.

This approach can be generalized such that the relative position of the expanded color point $P_E$ within the convex color gamut is a function of the relative position of the color point P within the device color gamut:

$$F_E = f_e(F_P)$$

where $f_e(\ )$ is the gamut expansion function. Two different gamut expansion functions are shown in FIG. 6. The first one is a linear gamut expansion function 60, and is equivalent to the example described above where the expanded fractional position FE is equated to original fractional position $F_P$. The second example shows a nonlinear gamut expansion function 62. In this case, the near neutral colors are not expanded at all, and the size of the expansion is gradually increased as the color point P gets closer to the gamut surface.

The expanded device model 36, (See FIG. 3), is adapted for use by a build color transform step 37 to build a color transform 38. In one embodiment of the present invention, the color transform 38 is an output device profile that can be used in a color management system. Such output device profiles generally relate input device-independent color values to the corresponding device control signals that can be used to produce that color on the color imaging device.

There are generally two steps that are necessary to build an output device profile. The first step is a gamut mapping step where any input device-independent color values outside the color gamut of the color imaging device are mapped to modified device-independent color values within the color gamut. In this case, the relevant color gamut would be the convex color gamut 34. In many cases, the color transforms used for output device profiles are comprised of a multi-dimensional look-up table whose inputs are a lattice of device-independent color values in a uniform color space such as CIELAB, and whose outputs are the corresponding device control signals. Generally, many of the colors in the lattice of device-independent color values will be outside of the convex color gamut 34. These device-independent color values need to be mapped to modified colors inside the convex color gamut 34 before the expanded device model 36 can be used to determine the appropriate device control signals. Any of a wide variety of gamut mapping methods can be used to perform this step, including those described in the background of this invention.

In a preferred embodiment of this invention, a minimum color difference gamut mapping method is used. This type of algorithm identifies the color on the surface of the convex color gamut 34 that has the minimum color difference from the input device-independent color values. Preferably, the color difference is determined using a color difference metric where hue, lightness and chroma differences are weighted independently. In particular, hue and chroma color differences are usually more objectionable than lightness color differences for many applications. If the hue, lightness and chroma weights are all set to be the same value, and the device-independent color space is CIELAB, then this is equivalent to finding the minimum CIE delta E* color difference value. In some cases, it will be desirable to adjust the weights for the hue, lightness and chroma differences as a function of color. For example, in some regions of color space, hue errors may be particularly objectionable and it may be desirable to increase the weight on the hue portion of the color difference.

Figure 8:
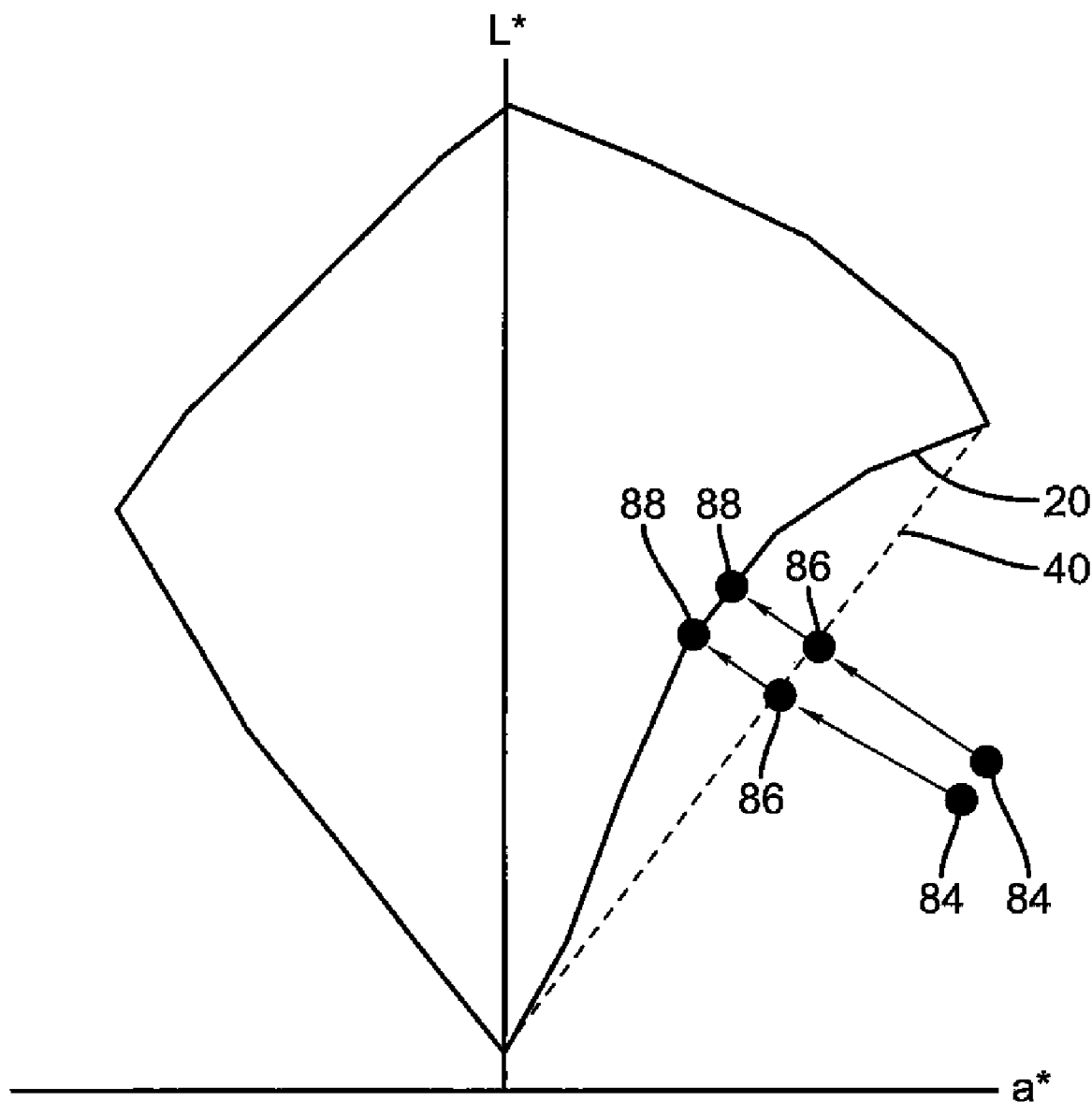
FIG. 8 is a diagram illustrating improved gamut-mapping characteristics that are achieved using the present invention.

FIG. 8 shows a diagram illustrating the application of a gamut mapping method in accordance with the method of the present invention. (This can be compared with the prior art example shown in FIG. 2.) A cross-section through a concave color gamut 20 is shown, together with the corresponding convex color gamut 40. Consider a pair of out-of-gamut colors 84. If a minimum color difference gamut-mapping method is used to map these colors onto the convex color gamut 20, they will be mapped to gamut-mapped colors 86. The gamut-mapped colors 86 will correspond to actual device colors 88 in the non-expanded color gamut. Relative to the situation shown in FIG. 2, it can be seen that the actual device colors 88 are much closer together than the analogous gamut-mapped colors 24 that were obtained when gamut-mapping to the concave color gamut 20. As a result this will substantially reduce the likelihood of producing image quality degradations such as contouring artifacts.

The second step involved with building an output device profile is to determine the device control signals needed to produce the modified device independent color values using a device model. In this case, the device-independent color values have been modified to fit within the convex color gamut 34, and the expanded device model 36 is used to build the color transform 38. There are many methods that have been described in the prior art for determining the device control signals using a device model. In a preferred embodiment of the present invention, an inverse expanded device model is determined by inverting the expanded device model. For cases where the color imaging device has three color channels, the process of inverting the expanded device model is generally quite straightforward since there is a one-to-one relationship between the device control signals and the corresponding device-independent color values. The situation is more complex for color imaging devices having four or more colorants since there are generally more than one set of device control signals that can be used to create a desired device-independent color value. In such cases, methods such as those described by Spaulding et al. in U.S. Pat. No. 5,553,199 or Poe et al. in U.S. Pat. No. 5,857,063 can be used to invert the expanded device model.

In many cases, it will be desirable to combine the output device profile with an input device profile to form a composite color transform that can be used to transform an input digital image from an input color space to device color signals appropriate for a particular color imaging device. For example, an input device profile for a video display can be combined with an output device profile for an inkjet printer produced according to the method of the present invention to produce a composite transform for converting from video display RGB code values to CMYK device control signals. The input device profile is comprised of an input device color model that relates input device control signals to corresponding input device-independent color values. A composite transform of this type is another example of a type of color transform 38 that can be produced in accordance with the present invention.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST

10 First device control values
11 First device color model
12 Device-independent color values
13 Second device color model
14 Second device control values
15 Composite color transform
20 Concave color gamut
22 Out-of-gamut colors
24 Gamut-mapped colors
30 Device model
31 Form device color gamut
32 Device color gamut
33 Form convex color gamut
34 Convex color gamut
35 Form expanded device model
36 Expanded device model
37 Build color transform
38 Color transform
40 Convex color gamut
60 Linear gamut expansion function
62 Nonlinear gamut expansion function
70 Original device model lattice
72 Expanded device model lattice
84 Out-of-gamut colors
86 Gamut-mapped colors
88 Actual device colors

What is claimed is:

1. A method for building color transforms for color imaging devices having color gamuts with one or more concave surface regions, comprising:
    a) forming a device model that relates device control signals for a color imaging device to corresponding device-independent color values in a device-independent color space;
    b) forming a device color gamut that represents the set of colors in the device-independent color space that are producible by the color imaging device, wherein the device color gamut has one or more concave surface regions;
    c) forming a convex color gamut by fitting a convex hull to the device color gamut;
    d) forming an expanded device model that relates device control signals for the color imaging device to expanded device-independent color values in the device-independent color space, such that the expanded device-independent color values fill the convex color gamut, wherein the formation of the expanded device model includes:
        i) determining the relative position of a device-independent color value within the device color gamut; and
        ii) determining an expanded device-independent color value within the three-dimensionally convex color gamut responsive to the relative position of the device-independent color value within the device color gamut; and
    e) building a color transform that relates input device-independent color values to corresponding device control signals for the color imaging device using the expanded device model.

2. The method of claim 1, wherein step e) includes:
    i) gamut mapping any input device-independent color values outside the convex color gamut to modified device-independent color values within the convex color gamut; and
    ii) determining The device control signals corresponding to The modified device-independent color values using the expanded device model.

3. The method of claim 2 where the device control signals corresponding to The modified device-independent color values are determined using an inverse expanded device model determined from the expanded device model.

4. The method of claim 2 where the gamut mapping step includes finding the device-independent color values in the convex color gamut having the minimum color difference relative to the input device-independent color values.

5. The method of claim 4 where the color difference is determined using the CIE delta E* color difference metric.

6. The method of claim 4 where the color difference is determined using a color difference metric where hue, lightness and chroma differences are weighted independently.

7. The method of claim 6 where weights used for the hue, lightness and chroma differences vary as a function of color.

8. The method of claim 1 where the color imaging device is a digital printing device.

9. The method of claim 8 where the digital printing device is an ink jet printer.

10. The method of claim 1 where the color imaging device is a softcopy display device.

11. The method of claim 1 where the device model is a multi-dimensional look-up table.

12. The method of claim 1 where the device model is formed by fitting measured device-independent color values for a set of patches with known device control signals.

13. The method of claim 1 where the relative position of the expanded device-independent color value within the convex color gamut is equated to the relative position of the device-independent color value within the device color gamut.

14. The method of claim 1 where the relative position of the expanded device-independent color value within the convex color gamut is a function of the relative position of the device-independent color value within the device color gamut.

15. The method of claim 1 where the relative position of the device-independent color value within the device color gamut is determined by projecting from a central color point through the device-independent color value to find an intersection point with the device color gamut, and computing the ratio of the distance between the central color point and the device-independent color value and the distance between the central color point and the intersection point with the device color gamut.

16. The method of claim 15 where the central color point is a neutral color point.

17. The method of claim 16 where the lightness of the neutral is a function of hue angle.

18. The method of claim 15 where the expanded device-independent color value is determined to have the same fractional position relative to the convex color gamut as that calculated for the device-independent color value relative to the device color gamut.

19. The method of claim 1 further including the step of determining the input device-independent color values using an input device color model that relates input device control signals to corresponding input device-independent color values.

20. A computer storage product having at least one computer storage medium having instructions stored therein causing one or more computers to perform the method according to claim 1.

* * * * *